No. 852,626. PATENTED MAY 7, 1907.
C. SCHWARZ & J. BORTZNER.
GRINDING MACHINE FOR GLASS PLATES.
APPLICATION FILED MAR. 2, 1906.

WITNESSES:
L. Waldman
C. Heymann

INVENTORS
Conrad Schwarz
BY Johann Bortzner
B. Singer ATTORNEY.

UNITED STATES PATENT OFFICE.

CONRAD SCHWARZ AND JOHANN BORTZNER, OF FÜRTH, GERMANY, ASSIGNORS TO N. WIEDERER & CO., OF FÜRTH, GERMANY.

GRINDING-MACHINE FOR GLASS PLATES.

No. 852,626.          Specification of Letters Patent.          Patented May 7, 1907.

Application filed March 2, 1906. Serial No. 303,850.

*To all whom it may concern:*

Be it known that we, CONRAD SCHWARZ and JOHANN BORTZNER, residing at Fürth, Bavaria, Germany, have invented certain new and useful Improvements in or Relating to Grinding-Machines for Glass Plates; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to grinding machines for beveling glass plates, and especially to machines of the kind in which the glass carrier is formed into a carriage, and the glass plate is forced by a pressure roller against the grinding surface. It differs from wellknown machines of the same kind by the special construction of the guide-carriages and by the arrangement of the pressure roll for the work by means of which the attendant is enabled to bring his eye at any moment into close proximity of the face to be ground, and thus to supervise the grinding operation in an exact manner. During this operation, the glass supporting carriage in well known manner, is not guided exactly at a right angle to the grinding stone axis, but arranged at a small angle to the same, so that a comparatively very long glass plate rests only against one side of the conical grinding surface, and therefore the facet is ground only in one direction.

Figure 1:
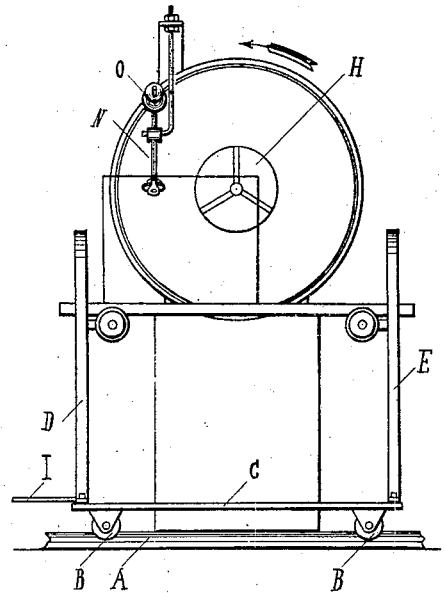
Figure 2:
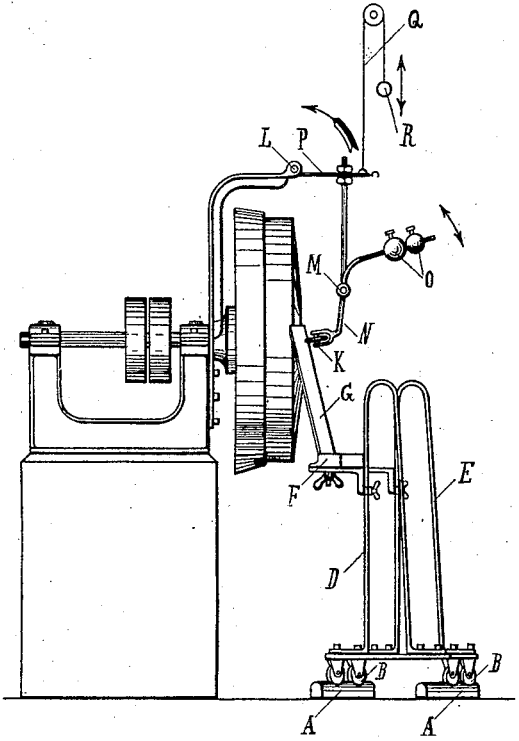
Figure 3:
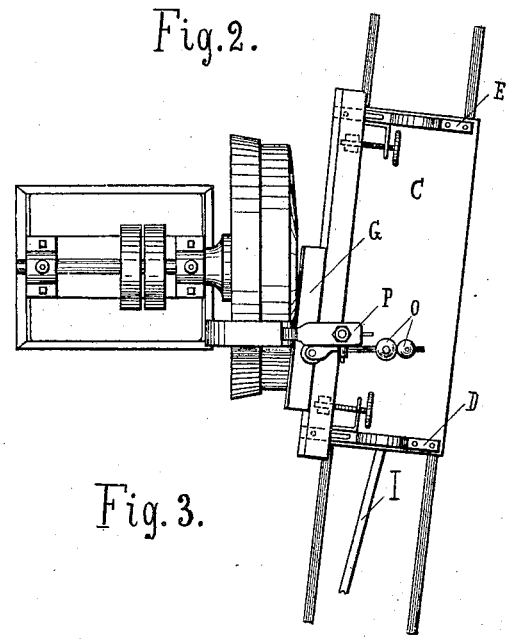

A construction according to this invention, is illustrated, by way of example in the accompanying drawing, in which Figure 1 shows the machine in front elevation, Fig. 2 in side elevation, and Fig. 3 in plan.

The glass supporting carriage travels with guide rollers $b$ on rails $a$ secured to the ground, so that the carriage platform $c$ can be arranged almost immediately above the ground. The gear for driving the carriage to and fro, can be of any desired kind, for instance the driving can be effected by connecting the car by means of a rod $i$ to a crank. The carriage is laterally bounded by two yoke-shaped struts $d$ and $e$, on which is adjustably mounted a bracket $f$ for carrying the glass plate $g$. The attendant can therefore, while remaining in front of the carriage and holding onto the struts $d$ and $e$, bend with the whole upper part of his body over the carriage and place his eye into the immediate neighborhood of the beveled face to be ground. He can also stand on the platform $c$ of the glass carrying carriage and participate in its movements, so that he can see and follow the grinding operation in a reliable and convenient manner. In order not to interfere in any way with the advantages resulting from the special construction of the carriage it is necessary to give a special shape to the device for pressing the edge of the glasses against the grinding stone. To that end the pressure roller $k$ is mounted on rods suitably pivoted above the grinding stone about a hinge pin $l$. The rods themselves are provided with a second hinge $m$, about which is pivoted a double lever $n$ carrying the roller $k$, the said lever, owing to the action of a weight $o$ pressing the roller $k$ against the glass plate. The arm $p$ of the rod, on which are adjustably mounted the remaining rods, is balanced by a weight $r$. Owing to this arrangement the roller $k$ can be easily and quickly lifted off from the glass plate by rotating the lever $n$, while at the proper throwing out of gear of the roller $k$, the whole of the rods are raised upward by turning about the hinge $l$. The adjustment of the rollers $k$ can therefore be effected by the attendant while he is watching the grinding operation, without it being necessary for him to leave his place or the carriage.

Having now particularly described and ascertained the nature of the said invention, as communicated to me by my foreign correspondent, and in what manner the same is to be performed, I declare that what I claim is:—

1. A grinding machine for glass comprising in combination, a rotatable grinder, a carriage provided with a base portion having supporting rolls or wheels, rails or tracks for said wheels, two inverted U-shaped uprights for said base portion of the carriage, a bracket adjustably mounted on said uprights and adapted to support the material to be ground, a fixed arm, a support pivotally mounted thereto to swing in a vertical plane, a weighted cord secured to the outer end of said support, a pulley about which said cord is trained, a rod adjustably mounted on said support, and a bell crank retaining arm or lever pivotally mounted to said rod to swing in a vertical plane, a roller for one end of said lever adapted to hold the work against the grinder, and adjustable weights for the other end of said lever.

2. A grinding machine for glass or the like comprising in combination, a grinder, a movably mounted carriage provided with uprights, a bracket adjustably mounted on said uprights and adapted to support the material to be ground, a fixed arm, a support pivotally mounted thereto to swing in a vertical plane, a weighted cord secured to the outer end of said support, a pulley about which said cord is trained, a rod adjustably mounted on said support, and a bell crank retaining arm or lever pivotally mounted to said rod to swing in a vertical plane, a roller for one end of said lever adapted to hold the work against the grinder, and adjustable weights for the other end of said lever.

3. A grinding machine for glass or the like comprising in combination, a grinder, a movably mounted carriage provided with uprights, a bracket adjustably mounted on said uprights, and adapted to support the material to be ground, a fixed arm, a support pivotally mounted thereto to swing in a vertical plane, means for holding the support in its adjusted positions, a rod adjustably mounted on said support, a retaining lever pivotally mounted on said rod to swing in a vertical plane, and a roller for said lever serving to engage the work and hold the same in operative relation to the grinder.

4. A grinding machine for glass or the like comprising in combination, a grinder, a movably mounted carriage for supporting the material to be ground, a fixed arm, a support pivotally mounted thereto to swing in a vertical plane, means holding the support in its adjusted positions, a rod adjustably mounted on said support, a retaining lever pivotally mounted on said rod to swing in a vertical plane, and a roller for said lever serving to engage the work and hold the same in operative relation to the grinder.

5. A grinding machine for glass or the like comprising in combination, a grinder, a support for the work, a pivotally mounted support adapted to swing in a vertical plane, means holding the support in its adjusted positions, a retaining lever pivotally mounted on said support and adapted to swing in a vertical plane, and a roller for said lever serving to hold the work in operative relation to the grinder.

6. A grinding machine for glass or the like comprising in combination, a grinder, a support for the work, a retaining member for holding the work in operative relation to the grinder, and a support for said retaining member articulated therewith, and an adjustable pivotal mounting for said support.

7. A grinding machine for glass or the like comprising in combination, a grinder, means for supporting the work in operative relation to the grinder, and means for holding the work in engagement with the grinder, said means comprising levers articulated at two points, one of said points being above the grinder and permitting said means to be thrown out of proximity to the work and grinder.

8. A grinding machine for glass or the like comprising in combination, a grinder, means for supporting the work in operative relation to the grinder, and means comprising levers articulated at two points for holding the work in engagement with the grinder, said means also comprising an adjusting device whereby the levers may be adjusted with respect to each other.

9. A grinding machine for glass or the like comprising in combination, a grinder, and a support for the work traveling abreast of the grinder, said support consisting of a carriage, U-shaped struts, and a bracket adjustably mounted on said struts.

Dated this 9 day of February 1906.

In testimony whereof we affix our signatures in presence of two witnesses.

CONRAD SCHWARZ.
JOHANN BORTZNER.

Witnesses:
HEINRICH FIETH,
HERMANN DÖHLOMANN.